United States Patent [19]

Kaschemekat et al.

[11] Patent Number: 4,900,402
[45] Date of Patent: Feb. 13, 1990

[54] PERVAPORATION PROCESS OF SEPARATING A LIQUID MIXTURE

[75] Inventors: Jürgen Kaschemekat, Geesthact; Frank Schütt, Grossenaspe; Axel Wenzlaff, Escheburg, all of Fed. Rep. of Germany

[73] Assignee: Kernforschungszentrum Karlsruhe GmbH, Karlsruhe, Fed. Rep. of Germany

[21] Appl. No.: 29,911

[22] Filed: Mar. 25, 1987

[30] Foreign Application Priority Data

Mar. 25, 1986 [DE] Fed. Rep. of Germany ....... 3610011

[51] Int. Cl.$^4$ .............................................. B01D 13/00
[52] U.S. Cl. ........................................ 203/19; 203/81; 203/82; 203/87; 203/DIG. 13; 203/DIG. 16; 159/DIG. 27; 210/640; 210/641; 435/161; 568/916
[58] Field of Search ........... 203/99, 100, 19, DIG. 13, 203/39, 87, 81, 82, DIG. 16, 98, 89; 159/47.1, DIG. 27, DIG. 28; 568/916; 435/161; 202/176, 178, 186; 210/641, 640

[56] References Cited

U.S. PATENT DOCUMENTS

| | | | |
|---|---|---|---|
| 2,583,601 | 1/1952 | Schwertz | 159/DIG. 27 |
| 2,970,106 | 1/1961 | Binning et al. | 203/39 |
| 2,981,680 | 4/1961 | Binning | 210/640 |
| 3,043,891 | 7/1962 | Stuckey | 210/640 |
| 3,230,245 | 1/1966 | Binning et al. | 203/39 |
| 3,617,550 | 11/1971 | Elata et al. | 210/641 |
| 4,311,594 | 1/1982 | Perry | 210/640 |
| 4,344,826 | 8/1982 | Smith | 159/DIG. 27 |
| 4,405,409 | 9/1983 | Tusel et al. | 203/19 |
| 4,434,057 | 2/1984 | Marquardt | 203/DIG. 16 |

FOREIGN PATENT DOCUMENTS

| | | | |
|---|---|---|---|
| 3315930 | 3/1984 | Fed. Rep. of Germany | 203/39 |
| 3410155 | 8/1985 | Fed. Rep. of Germany | 203/39 |
| 54-124875 | 9/1979 | Japan | 210/641 |
| 58-21629 | 2/1983 | Japan | 568/916 |
| 564870 | 7/1977 | U.S.S.R. | 203/19 |

OTHER PUBLICATIONS

Sun-Tak Hwang et al., *Techniques in Chemistry*, vol. VII, pp. 68, 86–89, 99–105, Robert E. Kreiger Publishing Company, Inc. (1984).

*Primary Examiner*—Wilbur Bascomb
*Attorney, Agent, or Firm*—Spencer & Frank

[57] ABSTRACT

A pervaporation process for separating at least one component from a mixture of liquids, for example for separating ethanol from a fermentation mass, by a series of three separation steps: separating the mixture by a first pervaporation to form a first permeate vapor enriched in the component to be separated; fractionating the first permeate vapor, for example by temperature condensation, to form a high concentration fraction twice enriched in the component to be separated; and either distilling the high concentration fraction or a second pervaporation to form a distillate or retentate liquid thrice enriched in the component to be separated.

17 Claims, 2 Drawing Sheets

PERVAPORATION PROCESS OF SEPARATING A LIQUID MIXTURE

FIELD OF THE INVENTION

The present invention relates to a pervaporation process of separating a mixture of liquids containing at least one component present in highly diluted form and, which is to be recovered therefrom, for example the recovery of ethanol from fermentation mashes.

TECHNOLOGY REVIEW

Ethanol produced, for example, in the fermentation of vegetable substances, has in the past been enriched to a maximum of 95% by volume (azeotropic mixture) (Chem.-Ing.-Tech. 53 (1981) No. 1, pages 47–50) by means of rectification distillation. Subsequent further purification to a minimum of 99.7% by volume is then usually done by distillation with an entraining agent. The economical recovery of the ethanol from fermentation mashes is dependent on the ethanol concentration in the mash. Below about 6% by volume ethanol, the energy required to obtain pure ethanol by distillation increases exponentially. Thus it is necessary to ferment those plants which furnish an ethanol content of more than 6% by volume in their fermentation mash. These are usually very valuable plants which are cultivated for the production of food, such as, for example, potatoes, sugarbeets, cereals, etc. To be able to obtain ethanol from other plants or their waste products from other uses, which furnish ethanol in low concentration when fermented, the energy requirement must be reduced.

Processes are already known for the dehydration or further purification of ethanol which employ pervaporation in conjunction with distillation to improve the energy balance U.S. Pat. No. 4,405,409 and West German Patent No. 3,410,155 However, these processes employ distillation to produce a highly concentrated ethanol of, for example, 80% by volume and employ pervaporation only to further purify this ethanol. Pervaporation thus merely takes the place of distillation with an entraining agent.

SUMMARY OF THE INVENTION

The invention provides a pervaporation process for separating at least one component from a mixture of liquids, for example for separating ethanol from a fermentation mass, by a series of three separation steps: separating the mixture by a first pervaporation to form a first permeate vapor enriched in the component to be separated; fractionating the first permeate vapor, for example by temperature condensation, to form a high concentration fraction twice enriched in the component to be separated; and a second pervaporation to form a retentate liquid thrice enriched in the component to be separated.

It is an object of the present invention to improve the above-mentioned process in such a way that ethanol, for example, can be produced under favorable economic and energy consumption conditions from mixtures which only contain a very small percentage of this substance.

DETAILED DESCRIPTION OF THE INVENTION

The invention will now be described in greater detail with reference to an embodiment illustrated in FIGS. 1 and 2.

Figure 1:
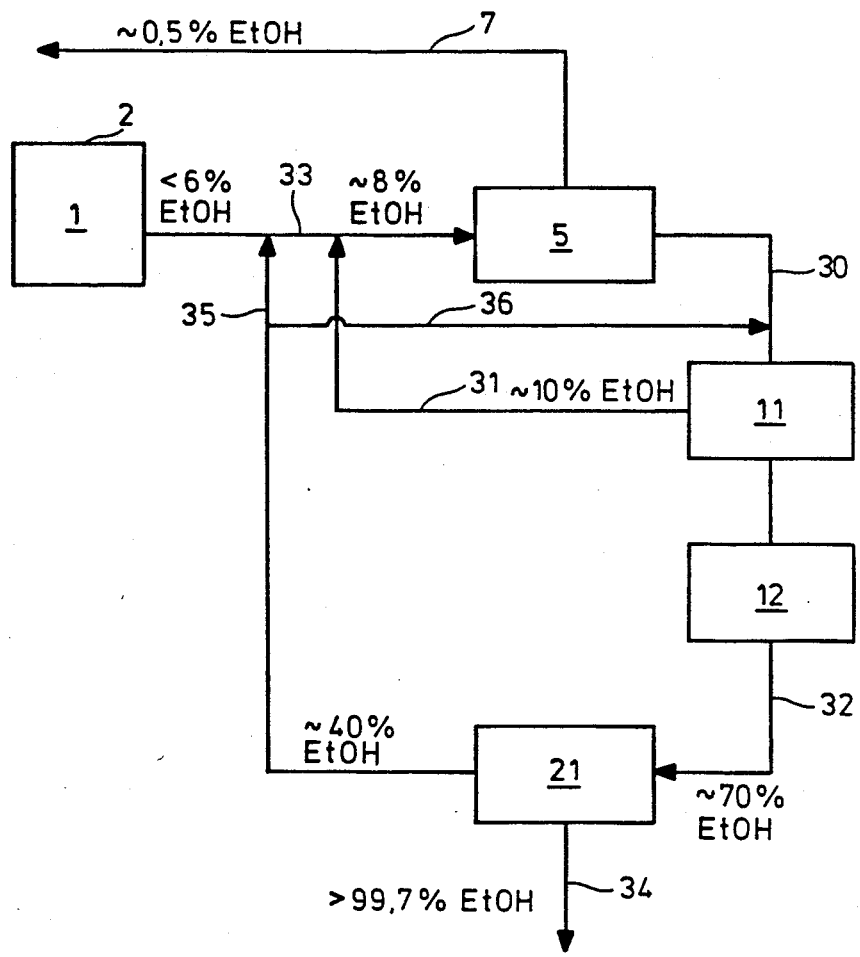
FIG. 1 gives a general overview of the apparatus employed to implement the process and utilizing series connected condensation stages.
Figure 2:
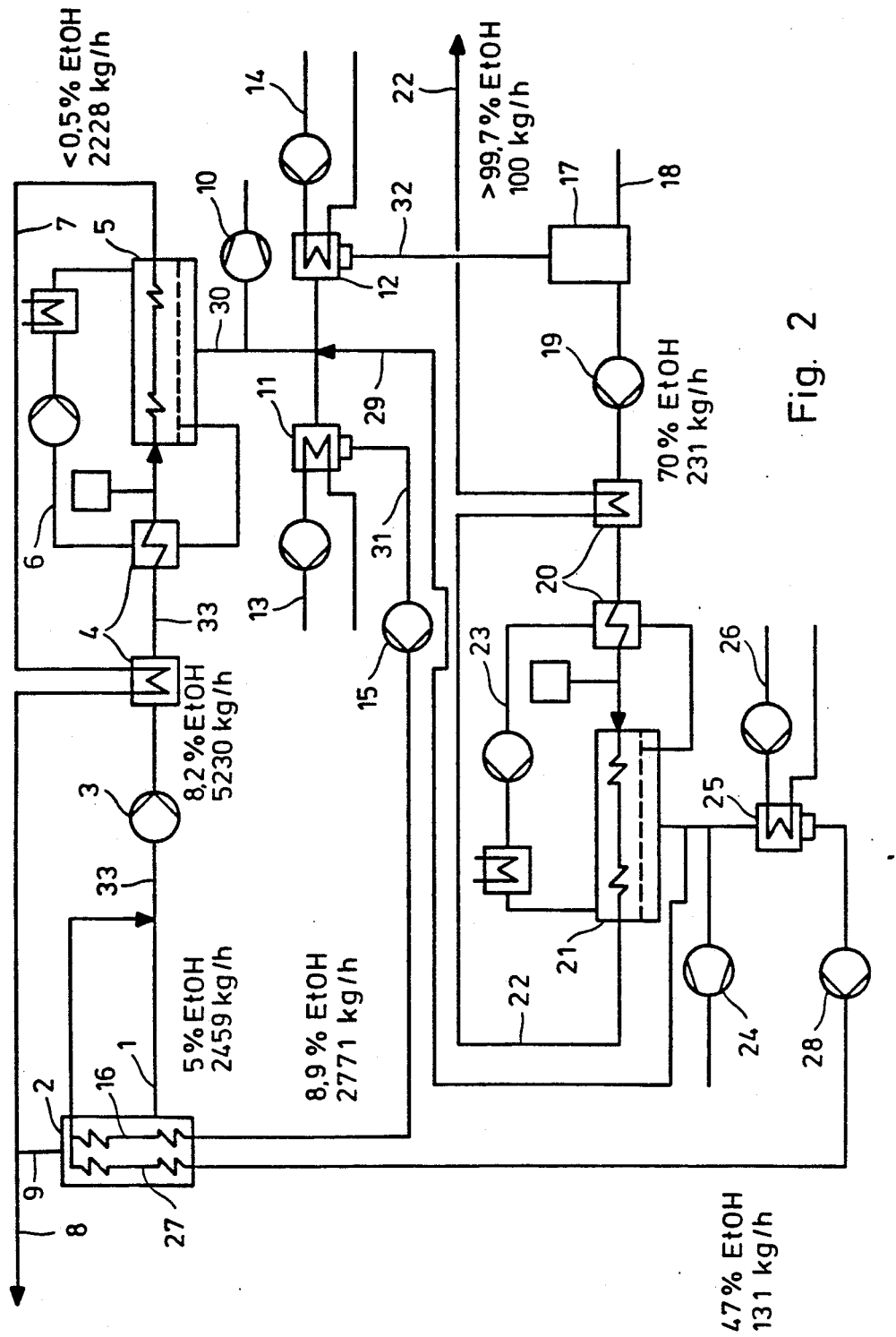
FIG. 2 shows a special device having parallel connected condensation stages.

According to FIG. 1, ethanol (EtOH) contained in a fermentation mash 1 in vessel 2 is removed from mash 1 by means of a first pervaporator 5. The membranes of the first pervaporator 5 furnish a permeate vapor 30 enriched with ethanol which is subjected to fractionated condensation in two series connected condensation stages 11 and 12 and is divided into a low concentration fraction 31 and a higher concentration fraction 32. Low concentration fraction 31 can be returned to the intake of pervaporator 5. The higher concentration fraction 32 is directly processed further for the recovery of pure ethanol 34, through a second pervaporation stage 21 to increase purity. If the higher concentration fraction does not meet the requirements, it is either returned 35 to the intake 33 or added 36 to permeate vapor 30.

Pevaporators 5 and 21 operate as is as follows. The preheated intake liquid stream 33 containing the components to be separated (for example ethanol/water) is conducted through a suitable semipermeable membrane (not shown). The vapor stream 30 permeating through the membrane is subjected to a phase change from liquid on the membrane inlet side to gaseous on the membrane permeate side. During this pervaporation, ethanol is extracted from the intake mixture by the use of suitable semipermeable membranes. The retentate 7 (see also FIG. 2) constitutes a slurry which is not subject to any change of state. The driving force for the flow of the permeate is a coarse vacuum (<50 mbar) present in the permeate chamber. The composition of the permeate is determined by sorption and transporting processes in the membrane. The vaporous permeate 30 is condensed by way of a stream of coolant and can be returned at a suitable location and/or processed further. Since the condensation enthalpy of the permeate depends on its composition, this process can be optimized in that the permeate stream 30 is exposed to various condensation temperatures and/or condensation pressures thus producing permeates 31, 32 which have different concentrations. From an energy aspect it is preferred to use a special vacuum pump (e.g. a liquid ring pump) between fractionation condensers 11 and 12 so that condensation can take place in condenser 12 under normal pressure. When this is done a water coolant stream at a temperature of 6° to 8° C. is sufficient in most cases for both condensers.

The evaporation of permeate at the membrane in pervaporators 5 and 21, removes heat from the stream flowing through which, in order to compensate for the drop in temperature must be returned by way of a heat carrier. The energy consumption of this process includes the evaporation enthalpy as well as the condensation enthalpy. The intake mixture 33 which selectively flows through the membrane is derichted to the lowest possible ethanol concentration which is still economically justified to produce retentate 7. Retentate 7 generally has an ethanol content of less than about 0.5% by volume. Retentate 7 leaves the system as a slurry while giving heat to intake stream 33 (see FIG. 2). If the ethanol concentration of the retentate 7 is too high, the process may operate as a batch process, i.e. the slurry is returned to fermentation vessel 2.

A device for implementing the process according to the invention will be described in greater detail below with reference to FIG. 2, with the ethanol concentration being given in percent by volume and the throughput being given in kg/h at respectively characteristic locations.

The mash 1 obtained during fermentation, which may have a raw ethanol content of less than 6% by volume, is extracted from fermentation vessel 2 by means of a pump 3 and conducted via heat exchanger 4 to pervaporator 5 through which it flows. Within this pervaporator 5, ethanol is removed from the flowing mash 1 by a semipermeable membrane of type A, as described below. The heat required for the evaporation permeation is supplied by way of a heating stream 6. Retentate 7, deriched in ethanol and having a final concentration of less than about 0.5% EtOH, gives heat to intake stream 33 and leaves the system as a slurry 8. In a batch process, it may also be returned 9 to fermentation vessel 2.

The ethanol enriched permeate vapor 30 obtained in pervaporator 5 by the application of a vacuum by means of a vacuum pump 10 is condensed in two parallel connected condensers 11 and 12. In condenser 11, a permeate 31 is condensed to about 10% EtOH by means of a coolant stream 13 having a temperature of about $-20°$ C. In condenser 12, the coolant stream 14, however, has a lower temperature of about $-50°$ C. Here a permeate 32 of about 70% to 75% EtOH is being condensed. The series and parallel connection of condensers 11 and 12 are equivalent to one another, with the series connection being able to operate at higher condensation temperatures. It is also possible to use a single condenser operating with temperature gradients.

In fermentation vessel 2, the low concentration condensate 31 is mixed by means of a pump 15 and while taking up heat 16 with the mash 1 flowing toward pervaporator 5.

Condensate 32 which has been enriched to more than 60% EtOH is conducted from condenser 12 to a buffer vessel 17 from which it can be processed further.

To make the alcohol absolute, the ethanol is conducted into a second pervaporation system 21. For this purpose, the ethanol is pumped by means of a pump 19 and conducted through heat exchangers 20 to the second pervaporator 21 through which it flows. The water is removed from the flowing ethanol/water mixture by the installation of a suitable semipermeable membrane. A membrane of type B, as described below, is used. The concentrated retentate 22 (or 34 in FIG. 1) leaves the system as absolute alcohol (product) while giving heat to the intake. Here again heat must be supplied to pervaporator 21 by way of a heating stream 23. Applying a vacuum by means of a vacuum pump 24 produces a permeate vapor which, depending on the type of semipermeable membrane employed, has an ethanol content of from about 20% to about 50% by volume. The permeate vapor may be conducted by way of a pipeline 29 (or 36 in FIG. 1) to condensers 11, 12 of the first pervaporation stage or the permeate condensed in condenser 25 with the aid of a coolant stream 26 may likewise be returned to mash 1 by means of a pump 28 while taking up heat 27 (see pipeline 35 in FIG. 1).

Two types of semipermeable membranes, A and B, can be employed for the pervaporation process.

Membrane type A: this type of semipermeable membrane increases the amount of the organic component in the permeate compared to the intake. Examples of membrane type A include membranes made of polysiloxanes (silicone), in the form of homogeneous films, or produced by the thin film composite technique, or incorporated as a gel or oil in the pores of porous frameworks of other polymers or ceramic thin films, or silanized silicate membranes, or in the form of settling membranes [dynamic membranes], produced from silanized silicates expanded and made hydrophobic in solvents or other chemicals.

In addition, microporous hydrophobic foils produced by precipitation from solvents or by stretching and having typical pore widths from 20 to 100 nm may be used.

Membrane Type B: this type of semipermeable membrane increases the water content in the permeate compared to the intake. Examples of membrane type B include membranes made of cellulose, cellulose esters and their mixtures, preferably of cellulose triacetate.

The use of various membranes A or B within the groups in one system simultaneously in successive pervaporators is contemplated according to the present invention; it optimizes separating precision and the quantity throughput per surface area.

Membranes of type A produce membrane flow rates between 20 and 400 $kg/m^2/day$ at, for example, an operating temperature of 40° C. The concentration in the permeate of, for example, ethanol increases, while passing through the membrane, from 8% to more than 30% which corresponds to a separation factor of 5 to 6.

Membranes of type B remove water with separation factors between 10 and 10,000, with the streams producing very high separating factors and, for example, a rate of about 0.1 $kg/m^2/day$ at 40° C. With smaller separation factors, flow rates of 25 $kg/m^2/day$ are typically achieved. Within this group of membranes the flow performance generally doubles for every 10° C. the intake flow temperature is increased. The separating precision is not changed thereby.

It is understood that various other modifications will be apparent to and can readily be made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A pervaporation membrane process for separating at least one component from a mixture of liquids, comprising:

separating a mixture of liquids by a first pervaporation membrane to form a first permeate vapor once enriched in at least one component to be separated, and a first retentate liquid deriched in said at least one component to be separated;

fractionating said first permeate vapor to form a high concentration fraction twice enriched in said at least one component to be separated, and a low concentration fraction deriched in said at lest one component to be separated;

separating said high concentration fraction by a second pervaporation membrane to form a second permeate vapor derichted in said at least one component to be separated, and a second retentate liquid thrice enriched in said at least one component to be separated; and recovering said at least one component to be separated from said second retentate liquid.

2. The pervaporation process of claim 1, including feeding said low concentration fraction derichted in said at least one component to be separated into said mixture of liquids to be separated by a first pervaporation.

3. The pervaporation process of claim 1, including feeding said second permeate vapor derichted in said at least one component to be separated into said first permeate vapor to be fractionated.

4. The pervaporation process of claim 1, including feeding said second permeate vapor derichted in said at least one component to be separated into said mixture of liquids to be separated by a first pervaporation.

5. The pervaporation process of claim 1, wherein said first permeate vapor is fractionated by serial condensation of the vapor in at least two condensers in series.

6. The pervaporation process of claim 5, wherein said first permeate vapor is fractionated by lowering the temperature of the first permeate vapor.

7. The pervaporation process of claim 5, wherein said first permeate vapor is fractionated by increasing the pressure of the first permeate vapor.

8. The pervaporation process of claim 1, wherein said mixture of liquids is fermentation mash and said at least one component to be separated is ethanol.

9. The pervaporation process of claim 1, wherein said first pervaporation membrane is a semipermeable membrane adapted to increase the amount of an organic component in the permeate vapor compared to the mixture of liquids.

10. The pervaporation process of claim 1, wherein said second pervaporation membrane is a semipermeable membrane adapted to increase the amount of a water component of the permeate vapor compared to the high concentration fraction.

11. A pervaporation membrane process for separating at least one component from a mixture of liquids, consisting essentially of:

separating a mixture of liquids by a first pervaporation membrane to form a first permeate vapor once enriched in at least one component to be separated, and a first retentate liquid derichted in said at least one component to be separated;

fractionating said first permeate vapor to form a high concentration fraction twice enriched in said at least one component to be separated, and a low concentration fraction derichted in said at least one component to be separated;

separating said high concentration fraction by a second pervaporation membrane to form a second permeate vapor derichted in said at least one component to be separated, and a second retentate liquid thrice enriched in said at least one component to be separated; and recovering said at least one component to be separated from said second retentate liquid.

12. The pervaporation process of claim 11, wherein said first pervaporation membrane is a semipermeable membrane adapted to increase the amount of an organic component in the permeate vapor compared to the mixture of liquids.

13. The pervaporation process of claim 11, wherein said second pervaporation membrane is a semipermeable membrane adapted to increase the amount of a water component of the permeate vapor compared to the high concentration fraction.

14. The pervaporation process of claim 11, wherein said mixture of liquids is a fermentation mash and said at least one component to be separated is ethanol.

15. The pervaporation process of claim 11, wherein said first permeate vapor is fractionated by serial condensation of the vapor in at least two condensers in series.

16. The pervaporation process of claim 15, wherein said first permeate vapor is fractionated by lowering the temperature of the first permeate vapor.

17. The pervaporation process of claim 15, wherein said first permeate vapor is fractionated by increasing the pressure of the first permeate vapor.

* * * * *